(No Model.)
O. C. BROWN.
CRATE FOR VEGETABLES, FRUIT, &c.
No. 250,628. Patented Dec. 6, 1881.
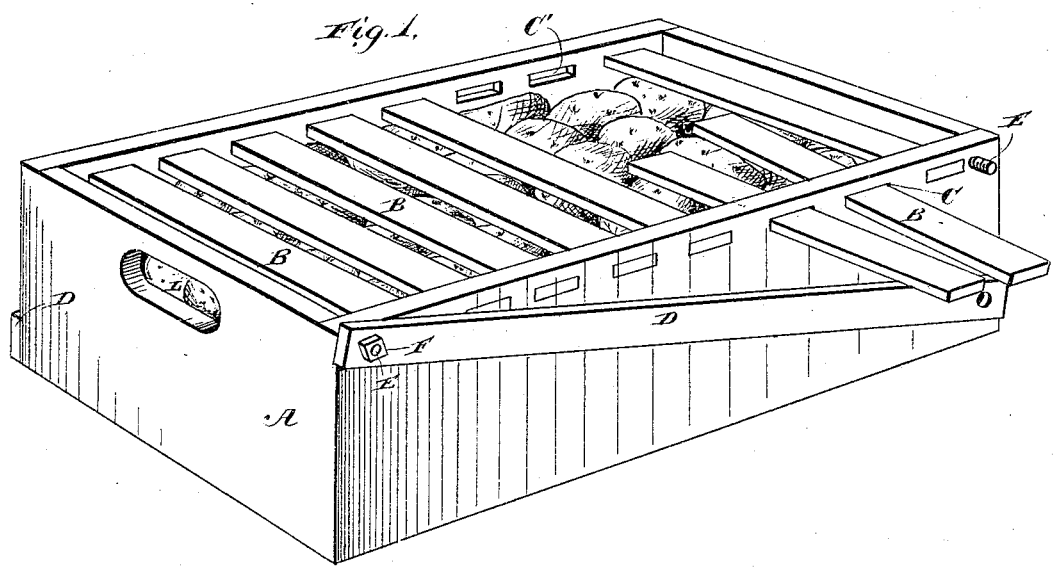
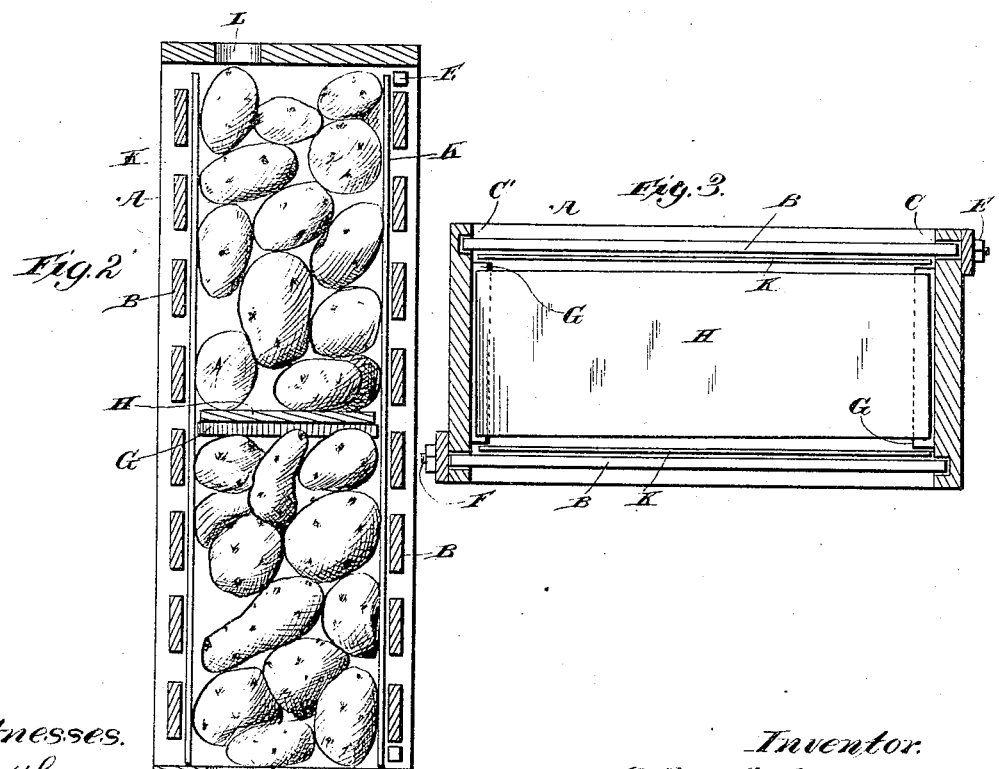
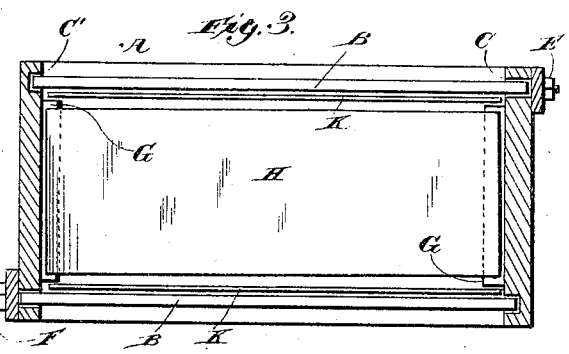
Witnesses.
Inventor.
Orlando C. Brown.
By James L. Norris
Atty.

UNITED STATES PATENT OFFICE.

ORLANDO C. BROWN, OF COLUMBUS, OHIO.

CRATE FOR VEGETABLES, FRUIT, &c.

SPECIFICATION forming part of Letters Patent No. 250,628, dated December 6, 1881.

Application filed November 15, 1881. (No model.)

*To all whom it may concern:*

Be it known that I, ORLANDO C. BROWN, a citizen of the United States, residing at Columbus, in the county of Franklin and State of Ohio, have invented new and useful Improvements in Crates for Vegetables, Fruits, &c., of which the following is a specification.

The object of my invention is to provide a simple, cheap, and durable crate for fruit, vegetables, &c., so constructed that the fruits or vegetables can be packed directly into the crate as they are gathered from the tree or field, and either shipped at once in the crate or be left therein, either in the field for curing purposes or in some other place for storage, for any desired length of time prior to said shipment, without liability of their becoming injured by frost in cold weather or damaged by heat in warm weather, either during said period of their retention in the crate in the field or other place of storage, or during their transportation in the crate to various parts of the country.

A further object of my invention is to provide certain improvements in the details of construction of the crate, as will hereinafter appear.

These objects I attain by means of the crate for fruit, vegetables, &c., constructed as illustrated in the accompanying drawings, in which—

Figure 1 is a perspective view of my improved crate for fruit and vegetables. Fig. 2 is a central longitudinal section thereof, and Fig. 3 a transverse section thereof.

The crate herein represented consists of a rectangular frame or body, A, which can be made of any desired material, size, or strength suitable for holding the fruits or vegetables. This frame has its largest sides or faces open, similar to a box without top or bottom, and these open sides are covered by means of a series of wooden or metal slats or bars, B, which are detachably connected with the said frame, in order that the slats of either set or series can be removed to admit of the filling or the emptying of the crate.

As a means for retaining the slats or bars in their seats, and also for admitting of their partial or entire removal from the main frame or body of the crate, I form mortises C through the body of the crate, at one side of the same, as shown, and in the opposite side I form mortises C', these said mortises constituting seats for supporting the slats. The slats are passed through the mortises C and their inner ends seated in the mortises C', whereby the crate will be provided with a cover composed of slats, any desired number of which can be readily removed laterally from the crate. The mortises C', that are formed in the inner wall of the frame opposite the mortises that pass entirely through the same, are, by preference, formed only partially through the body of the crate, whereby the construction will be stronger than if the said mortises were formed entirely through the frame. It will be seen that the crate is provided with two of these covers of slats, whereby, when desired, air can be allowed to have a free circulation through the body of the contained articles, thus curing or drying the same, and also preventing the generation of heat, which in many instances destroys such perishable articles.

In order to lock the slats in their seats, I hinge or pivot to the sides of the box a locking-bar, D, one for each series of slats, in such position that said bar can be brought against the exposed ends of the slats, and thus prevent their endwise movement. I further provide some suitable locking device for securing the free end of the locking-bar—such, for example, as a lock or seal, or, as herein illustrated, a screw-bolt, E, which can be passed through the body of the crate and the end of the locking-bar, so as to admit of a nut, F, being fitted upon the bolt and tightened up against the locking-bar. In lieu of such device, other fastening devices could be used—such, for example, as a rod passed through the end of the frame and through the slats within the crate, although such fastening would tend to weaken the slats, and hence would not be as desirable as the fastenings first described.

The crate is provided upon its inner walls with two or more cleats, G, for supporting a partition or partitions, H, which divides the interior of the crate into two or more parts. The crate is also provided at its ends with handles, or with openings I, which subserve the purpose of handles, and thus admit of the crate being readily carried from place to place.

Having thus described the construction of my improved crate, which, as will be seen, is designed to be used both as a bin for curing and storage, and also as a shipping-crate, I will now describe the method of using the same, and also point out some of the advantages which are incident to such use.

The fruit or vegetables can be packed into this receptacle, which I designate as a "combined bin and shipping-crate," directly in the field or orchard, thus saving the frequent handling of the vegetables or fruit. If, for example, potatoes are thus packed, and it is desired to leave the same in the field to be dried or cured, such can be readily and conveniently done by packing them into the crate and then standing up the crate on end, as shown in Fig. 2. The articles will thus be protected as far as necessary from extreme heat or from rain, and to a great extent from cold. If, however, it is desired to further protect said perishable articles from cold, sheets K, of stout paper or other suitable material, can be placed within the crate between the contained articles and the slats, thus closing up the slatted covers and excluding the cold. Thus far the receptacle has subserved the purpose of a portable bin, into which the articles can be packed and left either in the field to be dried and cured or carried to any desired place for storage.

It will be obvious that whenever required these bins can be used as shipping-crates, and the articles shipped without removal therefrom, and that by reason of the opposite slatted sides or covers of the crate there will be a sufficient circulation of air through the same to prevent the contained perishable articles from spoiling by heat.

The partition or partitions within the crate, while not being absolutely necessary, will still be found desirable, in order to prevent any crushing of the fruit or vegetables by reason of the weight of the same when the receptacle is stood on end. Said partitions may also serve as shelves or bottoms for supporting baskets containing small fruits, which it may be desired to thus put up for shipment.

What I claim is—

1. A crate for fruit, vegetables, &c., having a cover composed of a series of removable slats supported in seats formed by mortises in opposite sides of the body of the crate, and a locking-bar arranged to be brought into position for confining the slats in their seats, substantially as described.

2. A crate for fruit, vegetables, &c., having a cover composed of a series of slats supported in mortises at opposite sides of the body of the crate, a pivoted locking-bar arranged to be brought against the ends of the slats, and a device for locking the said bar in position to hold the slats, substantially as described.

3. The combination, with the rectangular frame A, formed with the series of mortises C C', of the covers upon opposite sides of the crate, composed of slats seated in said mortises and arranged to be withdrawn laterally from the crate, the locking-bars D, and the devices for locking the same, substantially as described.

In testimony whereof I have hereunto set my hand in the presence of two subscribing witnesses.

O. C. BROWN.

Witnesses:
JAMES L. NORRIS,
ALBERT H. NORRIS.